(12) United States Patent
Song et al.

(10) Patent No.: US 11,988,757 B2
(45) Date of Patent: May 21, 2024

(54) POSITIONING METHOD, POSITIONING SYSTEM AND AUTOMOBILE

(71) Applicant: Beijing National New Energy Vehicle Technology Innovation Center Co., Ltd., Beijing (CN)

(72) Inventors: Jubao Song, Beijing (CN); Chengyin Yuan, Beijing (CN)

(73) Assignee: Beijing National New Energy Vehicle Technology Innovation Center Co., Ltd., Beijing (CN)

( * ) Notice: Subject to any disclaimer, the term of this patent is extended or adjusted under 35 U.S.C. 154(b) by 198 days.

(21) Appl. No.: 17/770,300

(22) PCT Filed: Dec. 31, 2019

(86) PCT No.: PCT/CN2019/130854
§ 371 (c)(1),
(2) Date: Apr. 20, 2022

(87) PCT Pub. No.: WO2021/077622
PCT Pub. Date: Apr. 29, 2021

(65) Prior Publication Data
US 2022/0390621 A1    Dec. 8, 2022

(30) Foreign Application Priority Data

Oct. 22, 2019  (CN) .......................... 201911006726.5

(51) Int. Cl.
*G01S 19/47*   (2010.01)
*G01C 21/16*   (2006.01)
*G01C 21/20*   (2006.01)

(52) U.S. Cl.
CPC ............ *G01S 19/47* (2013.01); *G01C 21/165* (2013.01); *G01C 21/20* (2013.01)

(58) Field of Classification Search
CPC ........ G01S 19/47; G01S 19/14; G01S 19/396; G01S 19/485; G01S 17/95; G01C 21/165; G01C 21/20; G01C 21/188; Y02A 90/10
See application file for complete search history.

(56) References Cited

U.S. PATENT DOCUMENTS

2009/0058723 A1 * 3/2009 Mao ........................ G01S 19/47
                                              342/357.44
2010/0019963 A1 * 1/2010 Gao ........................ G01S 5/0027
                                              342/357.31
(Continued)

FOREIGN PATENT DOCUMENTS

CN       102252677 A    11/2011
CN       105866812 A    8/2016

OTHER PUBLICATIONS

International Search Report of PCT Patent Application No. PCT/CN2019/130854 issued on Mar. 27, 2020.

*Primary Examiner* — Keith D Bloomquist (57) ABSTRACT

A positioning method includes: acquiring the credibility of each positioning subsystem in different states and generating a credibility data table; acquiring the real-time credibility from the corresponding credibility data table according to real-time positioning data of each positioning subsystem; calculating a first information distribution weight coefficient of each positioning subsystem involving a fusion operation of an filter according to the real-time credibility of each positioning subsystem; respectively feeding back, by a main filter, a second information distribution weight coefficient of each positioning subsystem involving the fusion operation to each sub-filter according to global data; determining a final information distribution weight coefficient of each positioning subsystem involving the fusion operation according to the first information distribution weight coefficient and the second information distribution weight coef- (Continued)

ficient; and performing, by the filter, the fusion operation according to the final information distribution weight coefficient of each positioning subsystem and outputting a final positioning result.

9 Claims, 3 Drawing Sheets

(56) References Cited

U.S. PATENT DOCUMENTS

2020/0191942 A1\* 6/2020 Han ..................... G01S 13/878
2022/0147053 A1\* 5/2022 Lin ........................ H04W 4/40

\* cited by examiner

POSITIONING METHOD, POSITIONING SYSTEM AND AUTOMOBILE

FIELD OF TECHNOLOGY

The present disclosure relates to the technical field of navigation and positioning data processing, and more particularly, to a positioning method, a positioning system and an automobile using the positioning system.

BACKGROUND

An automotive high-precision positioning technology is classified into absolute positioning and relative positioning. Common laser radars and cameras all belong to the category of relative positioning; and fusion positioning of combination of global navigation satellite system (GNSS) positioning and an inertial measurement unit (IMU) may obtain latitude and longitude information and current attitude information of an automobile, reflecting an absolute position of the automobile in an earth coordinate system, and belongs to absolute positioning.

However, each type of positioning sensor has its own advantages as well as very obvious disadvantages.

For example, the laser radars may be well guaranteed in measurement accuracy, detection distance and final result, but have high costs and components easy to wear. Meanwhile, the laser radars are easier to block during use, and may not recognize colors, texts, patterns, etc., resulting in weak mass production capacity.

A visual positioning solution, mainly realized by a camera, is more mainstream in a current autonomous driving technology. This solution has the main advantages of low cost, ability to recognize text colors and patterns, and etc. However, the effect of visual positioning will be affected by ambient light, and is also poorer in rainy and snowy or foggy weather.

GNSS satellite positioning and inertial navigation are widely used in automotive navigation. The GNSS positioning has the main advantages of low cost and high precision. At present, the GNSS positioning may reach a dynamic centimeter level based on differentiated services provided by Qianxunweizhi. The inertial navigation and a GNSS are often used in the industry for fusion, because the automobile may still be positioned accurately even when a GNSS signal is lost in combination with the inertial navigation.

However, since the inertial navigation is realized by reckoning, a cumulative error will become more obvious over time, and it needs to obtain a more accurate initial position before it may be reckoned. Generally, it does not exist as a separate navigation sensor, and often needs to be matched with other sensors for use.

The above types of sensors have their own advantages and disadvantages, and it is difficult to find an optimal solution that takes into account all aspects during actual application, so that the advantages of each sensor may not be made full use of, and the system is incapable of obtaining stable and reliable high-precision positioning results in some special scenarios, such as under overpasses, beside tall buildings, tunnels and underground garages, and scenarios with a lot of tree shades.

Therefore, it is necessary to propose a positioning method capable of making full use of the advantages of each sensor to obtain the stable and reliable high-precision positioning results.

SUMMARY

An objective of the present disclosure is to provide a positioning method, a positioning system and an automobile, which may make full use of the advantages of each sensor to obtain stable and reliable high-precision positioning results.

To achieve the objective, the present disclosure provides a positioning method, including:

acquiring credibility of each of a plurality of different positioning subsystems in different states and generating a credibility data table for each positioning subsystem;

acquiring real-time credibility from the corresponding credibility data table according to real-time positioning data of each positioning subsystem;

calculating a first information distribution weight coefficient of each positioning subsystem involving a fusion operation of a Federated Kalman filter according to the real-time credibility of each positioning subsystem;

acquiring a second information distribution weight coefficient of each positioning subsystem involving the fusion operation fed back to each sub-filter of the Federated Kalman filter by a main filter of the Federated Kalman filter according to global data;

determining a final information distribution weight coefficient of each positioning subsystem involving the fusion operation according to the first information distribution weight coefficient and the second information distribution weight coefficient; and performing, by the Federated Kalman filter, the fusion operation according to the final information distribution weight coefficient of each of the positioning subsystems and outputting a final positioning result.

Optionally, calculating the first information allocation weight coefficient of each positioning subsystem involving the fusion operation of the Federated Kalman filter according to the real-time credibility of each positioning subsystem comprises:

calculating the percentages of the real-time reliability of each positioning subsystem to a sum of the real-time reliabilities of the plurality of subsystems, and taking each of the percentages as the first information distribution weight coefficient of each positioning subsystem involving the fusion operation of the Federated Kalman filter.

Optionally, determining the final information distribution weight coefficient of each positioning subsystem involving the fusion operation according to the first information distribution weight coefficient and the second information distribution weight coefficient comprises:

adding the first and second information distribution weight coefficients of each of the positioning subsystems and then performing averaging to serve as the final information distribution weight coefficient of each positioning subsystem.

Optionally, after acquiring the credibility of each positioning subsystem in the different states, the positioning method further comprises:

respectively setting a reliability threshold of each of the positioning subsystems, and when the real-time reliability of the subsystem is higher than or equal to the corresponding reliability threshold, enabling the subsystem to involve the fusion operation; and when the real-time reliability of the subsystem is lower than the corresponding reliability threshold, enabling the subsystem not to involve the fusion operation.

Optionally, the credibility of each of the positioning subsystems in the different states are acquired by calculating the percentages of best states and worst states of operating parameters in historical statistical data of each of the positioning subsystems based on the historical statistical data of the states of the operating parameters of each positioning subsystem.

Optionally, acquiring the credibility of each of the positioning subsystems in the different states comprises: acquiring, by at least one of a high-precision map mode, an internal parameter mode, and an external parameter mode, the reliabilities of the plurality of positioning subsystems in the different states, where the plurality of positioning subsystems comprise a combined navigation and positioning subsystem, a laser point cloud positioning subsystem and a camera visual positioning subsystem, and each of the sub-filters is configured to filter the positioning data output by one of the positioning subsystems.

Optionally, the high-precision map mode comprises:
acquiring the degree of building occlusion in external environment information at different locations according to a high-precision map and setting the reliabilities of the combined navigation and positioning subsystem corresponding to the different locations, where the reliability of the combined navigation and positioning subsystem is negatively related to the degree of building occlusion;
acquiring the degree of obviousness of features of surrounding objects in the external environment information at the different locations according to the high-precision map and setting the reliabilities of the laser point cloud positioning subsystem corresponding to the different locations, where the reliability of the laser point cloud positioning subsystem is positively related to the degree of obviousness of the features of the surrounding objects; and
acquiring the degree of light change in the external environment information at the different locations according to the high-precision map and setting the reliabilities of the laser point cloud positioning subsystem corresponding to the different locations, where the reliability of the camera visual positioning subsystem is positively related to the degree of light change.

Optionally, the internal parameter mode comprises:
setting reliabilities of the combined navigation and positioning subsystem corresponding to different degrees of stability of global navigation satellite system (GNSS) signal and the number of connected satellites according to the degree of stability of the GNSS signal and the number of the connected satellites in the combined navigation and positioning subsystem, wherein the reliability of the combined navigation and positioning subsystem is positively related to the degree of stability of the GNSS signal and the number of the connected satellites;
setting reliabilities of the laser point cloud positioning subsystem corresponding to different degrees of matching of point cloud according to the degree of matching of the point cloud in the laser point cloud positioning subsystem, wherein the reliability of the laser point cloud positioning subsystem is positively related to the degree of matching of the point cloud; and
setting reliabilities of the camera visual positioning subsystem corresponding to different degrees of matching of features according to the degree of matching of the features in the camera visual positioning subsystem, wherein the reliability of the camera visual positioning subsystem is positively related to the degree of matching of the features.

Optionally, the external parameter mode comprises:
setting reliabilities of the laser point cloud positioning subsystem corresponding to different values of particulate matter 2.5 (PM2.5) according to the values of the PM2.5 acquired by an external PM2.5 measurement sensor, wherein the reliability of the laser point cloud positioning subsystem is negatively related to the values of PM2.5; and
setting reliabilities of the camera visual positioning subsystem corresponding to different brightness values of light according to the brightness values of the light acquired by an external light sensor, wherein the reliability of the camera visual positioning subsystem is positively related to the brightness value of the light.

The present disclosure further provides a positioning system, comprising: a plurality of positioning subsystems, a Federated Kalman filter, a reliability database and a reliability evaluation module, where the Federated Kalman filter comprises a main filter and a plurality of sub-filters;
the reliability database is configured to store a reliability data table for each positioning subsystem, where each reliability data table stores the reliabilities of each of the positioning subsystems in different states;
the reliability evaluation module is configured to acquire the real-time credibility from the corresponding credibility data table according to real-time positioning data of each positioning subsystem and calculate a first information distribution weight coefficient of each positioning subsystem involving a fusion operation of the Federated Kalman filter according to the real-time credibility of each positioning subsystem;
the main filter is configured to feed back a second information distribution weight coefficient of each positioning subsystem involving the fusion operation to each of the sub-filters according to global data;
the reliability evaluation module is configured to determine a final information distribution weight coefficient of each positioning subsystem involving the fusion operation according to the first information distribution weight coefficient and the second information distribution weight coefficient; and
the Federated Kalman filter is configured to perform the fusion operation according to the final information distribution weight coefficient of each of the positioning subsystems and output a final positioning result.

Optionally, the reliability evaluation module calculates the percentages of the real-time reliability of each positioning subsystem to a sum of the real-time reliabilities of the plurality of subsystems, and takes each of the percentages as the first information distribution weight coefficient of each positioning subsystem involving the fusion operation of the Federated Kalman filter.

Optionally, the reliability evaluation module adds the first and second information distribution weight coefficients of each of the positioning subsystems and then performs averaging to serve as the final information distribution weight coefficient of each positioning subsystem.

Optionally, the reliability evaluation module presets a reliability threshold of each of the positioning subsystems, and when the real-time reliability of the subsystem is higher than or equal to the corresponding reliability threshold, the subsystem performs the fusion operation; and when the real-time reliability of the subsystem is lower than the corresponding reliability threshold, the subsystem does not perform the fusion operation.

Optionally, the positioning system further includes a high-precision map and an inertial measurement unit, where the high-precision map and the inertial measurement unit are configured to provide absolute position information; and the plurality of subsystems comprise a combined navigation and positioning subsystem, a laser point cloud positioning subsystem and a camera visual positioning subsystem, and each of the sub-filters is configured to filter the positioning data output by one of the positioning subsystems.

The present disclosure has the following beneficial effects:

The multi-source fusion operation is performed on the positioning data output by the plurality of different positioning subsystems through the Federated Kalman filter, and the first information distribution weight coefficient is acquired according to the real-time reliability of the different positioning subsystems; the final information distribution weight coefficient of each positioning subsystem involving the fusion operation is adjusted in combination with the first information distribution weight coefficient and the second information distribution weight coefficient fed back by the main filter to effectively optimize the information distribution weight of each positioning subsystem, thereby improving the positioning accuracy and robustness of the system; and meanwhile, the present disclosure can adapt to various application scenarios in different environments and all-day accurate positioning.

An apparatus of the present disclosure has other features and advantages, which will be apparent from the accompanying drawings and the subsequent detailed embodiments incorporated herein, or will be stated in detail in the accompanying drawings and the subsequent detailed embodiments incorporated herein. These accompanying drawings and detailed embodiments together serve to explain specific principles of the present disclosure.

BRIEF DESCRIPTION OF THE DRAWINGS

The above and other objectives, features and advantages of the present disclosure will become more apparent from the more detailed description of the exemplary embodiments of the present disclosure in conjunction with the accompanying drawings. In the exemplary embodiments of the present disclosure, the same reference numbers generally refer to the same parts.

DESCRIPTION OF REFERENCES 1, high-precision map; 2, combined navigation device; 3, laser radar device; 4, visual sensor device; 5, Federal Kalman filter; 6, main filter; 7, sub-filter; 8, combined navigation and positioning attitude fixing unit; 9, point cloud feature recognition unit; 10, laser point cloud positioning unit; 11, image feature recognition unit; 12, camera visual positioning unit; 13, feature matching unit; 14, positioning database; 15, path planning unit; 16, credibility evaluation module.

DETAILED DESCRIPTION OF THE EMBODIMENTS

The present disclosure will be described in more detail below with reference to the accompanying drawings.

Although preferred embodiments of the present disclosure are shown in the accompanying drawings, it should be understood that the present disclosure may be implemented in various forms and should not be limited by the embodiments stated herein. Instead, these embodiments are provided to make the present disclosure clearer and completer and completely convey the scope of the present disclosure to those skilled in the art.

Figure 1:
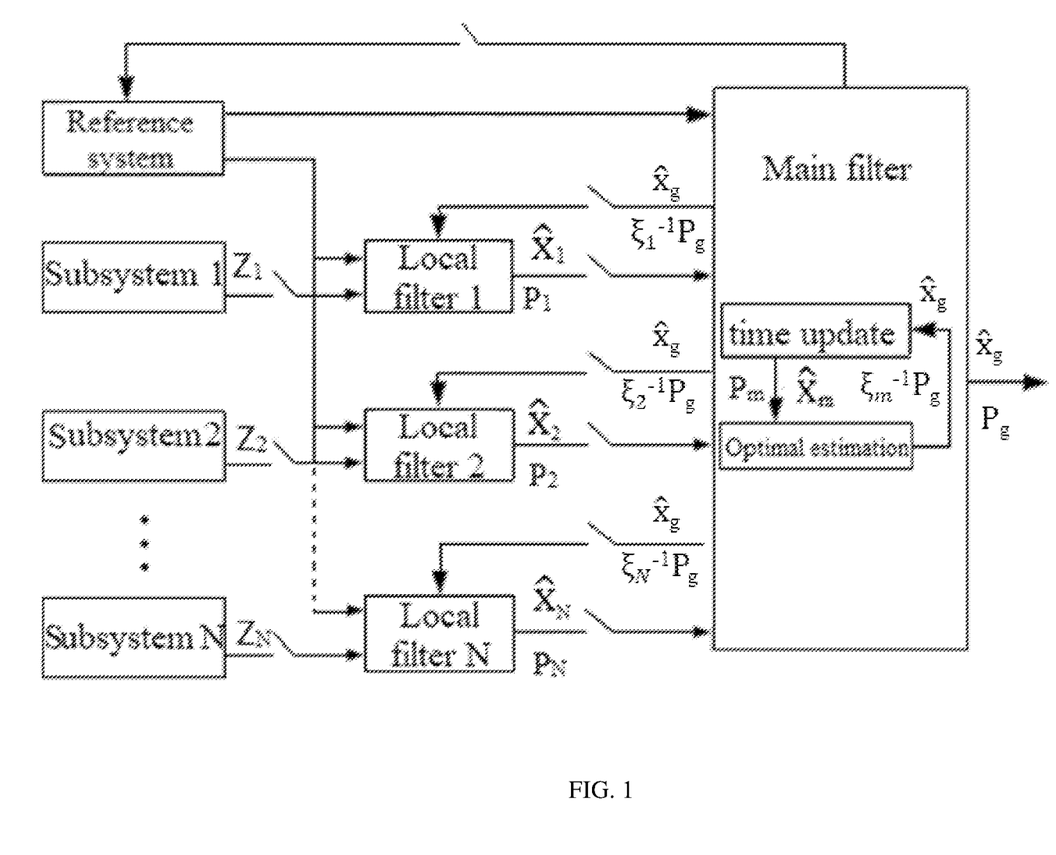
FIG. 1 illustrates a schematic structural diagram of a Federated Kalman filter model.

A Federated Kalman Filter (FKF) is an existing technology, with a main principle of performing distributed processing and global fusion successively to obtain a global optimal or suboptimal estimation based on all observed quantities. A general structure of the FKF is as shown in FIG. 1. An algorithm of the FKF is mainly divided into two parts: local estimation and global estimation.

A local filter in FIG. 1 outputs a local estimated value, and the local estimated value at the same moment is passed to a main filter and is fused with an output value of a reference system to output the global optimal estimation. The main filter includes two steps: time update and optimal estimation. The time update is mainly based on an estimation result of the last moment, and the optimal estimation mainly combines a time update value of the main filter and a passed value of each sub-filter. The global optimal estimation of the main filter and variance matrixes of estimation errors are respectively fed back to each sub-filter by a certain coefficient ratio. In addition, the reference system also needs to receive feedbacks of the global optimal estimation of the main filter and the variance matrixes of the estimation errors at the same time. It should be noted that it is not necessary to pass the output value of the reference system to the main filter.

It is assumed that a state vector is passed from a moment k−1 to a moment k according to the following state equation:

$$X_k = F_{k,k-1} X_{k-1} + W_{k-1}$$

An observation equation of the ith subsystem is as follows:

$$Z_{ik} = H_{ik} X_{ik} + V_{ik}$$

where $X_k$ is a state at the moment k, $Z_{ik}$ is an observation value of the ith subsystem, $W_{k-1}$ is a noise at the moment k−1, and $V_{ik}$ is an observation noise of the ith subsystem. Through the above formulas, we may find that the two equations of the FKF are similar to those of a linear KF, and noise statistical characteristics of the equations of the FKF are also consistent with those of the KF, where noises are all Gaussian noises.

It is assumed that local estimated values of N sub-filters are $\hat{x}_1, \hat{x}_2 \ldots \hat{x}_N$, variance matrixes of corresponding estimation errors are $P_1, P_2 \ldots P_N$, and covariance matrixes of system noises is $Q_1, Q_2 \ldots Q_N$. Meanwhile, the time update value of the main filter is a state estimation $\hat{x}_m$, a variance matrix $P_m$ of the estimation error, and a covariance matrix $Q_m$ of the system noise; the global optimal estimation may be calculated according to the formulas; and positioning data of the plurality of positioning subsystems is a sum of that of each positioning subsystem. $P_g^{-1}$ and $Q_g^{-1}$ are state estimation values, and $P_g$ and $Q_g$ are optimal values. The sub-filters are mainly used to correct the state estimation values according to the observation values to obtain optimal estimation values.

$$P_g^{-1} \hat{x}_g = P_1^{-1} \hat{x}_1 + P_2^{-1} \hat{x}_2 + \ldots + P_N^{-1} \hat{x}_N + P_m^{-1} \hat{x}_m$$

$$Q_g^{-1} = Q_1^{-1} + Q_2^{-1} + \ldots + Q_N^{-1} + Q_m^{-1}$$

$$P_g^{-1} = P_1^{-1} + P_2^{-1} + \ldots + P_m^{-1}$$

The value fed back to the local filter distributes overall information according to the following rules. A state estimation value and a covariance matrix of a filter subsystem are updated by using data fed back by a global system, that is, the global system may correct and feed back for the filter subsystem. Specific intervention of the global system on the subsystem is adjusted according to an information distribution strategy.

$$\hat{x}_i = \hat{x}_g$$

$$Q_i^{-1} = \beta_i Q_g^{-1}$$

$$P_i^{-1} = \beta_i P_g^{-1}$$

where $\hat{x}_i$ is the global optimal estimation value, $P_i^{-1}$ is a covariance matrix of the global optimal estimation, and $\beta_i$ is the information distribution coefficient ($\beta_i$ corresponds to the second information distribution weight coefficient in the present disclosure).

A positioning method of the present disclosure includes:
the credibility of each of a plurality of different positioning subsystems in different states are acquired and a credibility data table for each positioning subsystem is generated;
the real-time credibility from the corresponding credibility data table is acquired according to real-time positioning data of each positioning subsystem;
a first information distribution weight coefficient of each positioning subsystem performing a fusion operation of a Federated Kalman filter is calculated according to the real-time credibility of each positioning subsystem;
acquiring a second information distribution weight coefficient of each positioning subsystem involving the fusion operation fed back to each sub-filter of the Federated Kalman filter by a main filter of the Federated Kalman filter according to global data; a final information distribution weight coefficient of each positioning subsystem involving the fusion operation is determined according to the first information distribution weight coefficient and the second information distribution weight coefficient; and
the Federated Kalman filter performs the fusion operation according to the final information distribution weight coefficient of each positioning subsystem and outputs a final positioning result.

Figure 2:
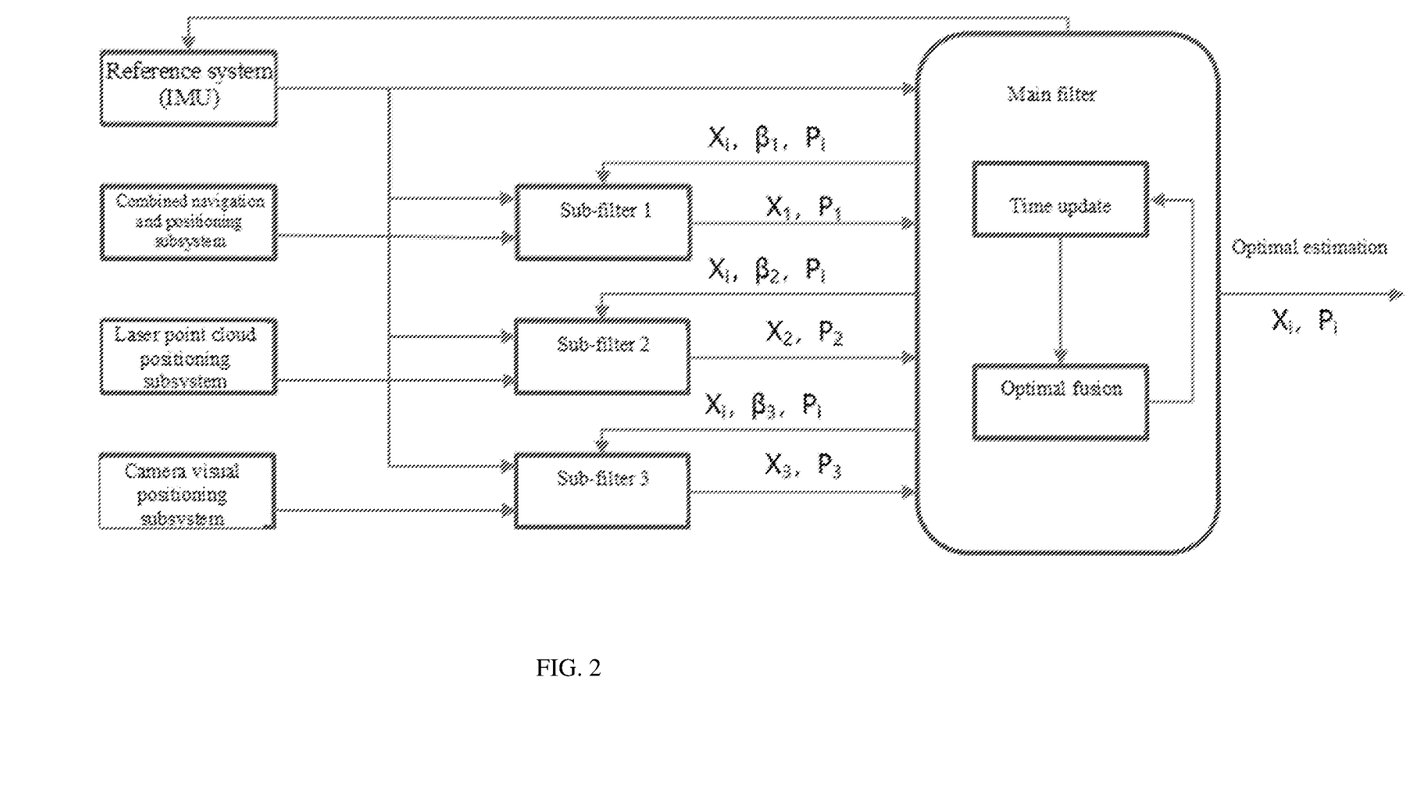
FIG. 2 illustrates a schematic diagram of a Federated Kalman filter model in a positioning method according to an embodiment of the present disclosure.

Specifically, multi-source fusion is performed on the positioning data output by the plurality of different positioning subsystems through the Federated Kalman filter, and the first information distribution weight coefficient is acquired according to the real-time reliability of the different positioning subsystems; the final information distribution weight coefficient of each positioning subsystem involving the fusion operation is adjusted in combination with the first information distribution weight coefficient and the second information distribution weight coefficient fed back by the main filter to effectively optimize the positioning information distribution weight of the positioning data output by each positioning subsystem involving the fusion operation in real time, thereby improving the positioning accuracy and robustness of a positioning system; and meanwhile, the present disclosure can adapt to various application scenarios in different environments and all-day accurate positioning. In this embodiment, the plurality of positioning subsystems comprise a combined navigation and positioning subsystem, a laser point cloud positioning subsystem and a camera visual positioning subsystem, and each sub-filter is configured to filter the positioning data output by one positioning subsystem. A filtering algorithm of the present disclosure is as shown in FIG. 2, where $X_i$ is a state estimation value, $P_i$ is a covariance matrix, and $\beta_i$ is the information distribution weight coefficient fed back by the main filter, that is, the second information distribution weight coefficient.

In this embodiment, the step that the first information allocation weight coefficient of each positioning subsystem involving the fusion operation of the Federated Kalman filter is calculated according to the real-time credibility of each positioning subsystem comprises:
the percentages of the real-time reliability of each positioning subsystem to a sum of the real-time reliability of the plurality of subsystems are calculated, and each of the percentages is taken as the first information distribution weight coefficient of each positioning subsystem involving the fusion operation of the Federated Kalman filter.

The step that the final information distribution weight coefficient of each positioning subsystem involving the fusion operation is determined according to the first information distribution weight coefficient and the second information distribution weight coefficient comprises:
the first and second information distribution weight coefficients of each positioning subsystem are added and then averaged to serve as the final information distribution weight coefficient of each positioning subsystem.

Specifically, during the operation of the positioning system, the real-time reliability acquired from positioning devices, such as a high-precision map, an external sensor, etc., will not be directly used for the sub-filters, and needs to be adjusted according to covariance matrix data fed back by the main filter; the real-time reliability of each positioning subsystem is divided by the sum of the real-time reliability of all the positioning subsystems to obtain a distribution weight coefficient $\beta_i'$ (i.e., the first information distribution weight coefficient), and the distribution weight coefficient and $\beta_i$ (i.e., the second information distribution weight coefficient) fed back with the main filter are added and averaged to obtain a mean value; and this mean value is used as the real information distribution coefficient (i.e., the final information distribution weight coefficient of each positioning subsystem) of each positioning subsystem. The distribution weight coefficients of this solution are calculated according to the input real-time reliability and the optimization of the algorithm of the filter, and the information distribution weight coefficients may be optimized in real time. In other embodiments of the present disclosure, a non-mean-value calculation way may also be used to calculate the real information distribution coefficient of each positioning subsystem; for example, the first information distribution weight coefficient accounts for 30%, and the second information distribution weight coefficient accounts for 70% or other; and those skilled in the art may choose a specific calculation way according to the actual situation, which will not be repeated here.

In this embodiment, after the credibility of each positioning subsystem in the different states is acquired, the positioning method further comprises:
a reliability threshold of each positioning subsystem is respectively set, and when the real-time reliability of the subsystem is higher than or equal to the corresponding reliability threshold, the subsystem performs the fusion operation; and when the real-time reliability of the subsystem is lower than the corresponding reliability threshold, the subsystem does not perform the fusion operation.

Specifically, an information feedback strategy of this solution uses a mixed feedback model (i.e., a feedback model and a feedback-free model of the FKF are combined). By setting a credibility threshold, the main filter, if the credibility of one subsystem is lower than the corresponding credibility threshold, feeds back for and corrects the current subsystem, and if the reliability of each positioning subsystem is higher than the reliability threshold, does not feed back for and correct the positioning subsystem. For example, the system uses three different positioning solutions of combined navigation and positioning, laser point cloud positioning and camera visual positioning. Under normal operation, the main filter does not feed back for each positioning subsystem. When the combined navigation and positioning is affected by signal occlusion, the positioning reliability output by each positioning subsystem is lower than the threshold, the main filter starts to feed back for and correct each positioning subsystem to make it not perform a multi-source fusion positioning algorithm, and the positioning data output from the laser point cloud positioning and the camera visual positioning is only used to perform the multi-source fusion positioning operation and distribute a corresponding weight ratio, thereby improving the positioning accuracy and robustness of the system.

In this embodiment, the credibility of each positioning subsystem in the different states is acquired by calculating the percentages of best states and worst states of operating parameters in historical statistical data of each positioning subsystem based on the historical statistical data of the states of the operating parameters of each positioning subsystem.

Specifically, the reliability of each positioning subsystem is calculated according to different states of the operating parameters of each positioning subsystem. The algorithm is obtained according to statistics. The percentages of the best states and the worst states of the operating parameters are calculated to obtain different reliability of each positioning subsystem in the different states. The reliability as a part of sensor parameters is pre-statistically obtained and set in a corresponding confidence data table.

In this embodiment, the step that the credibility of each positioning subsystem in the different states is acquired comprises: the reliability of the plurality of positioning subsystems in the different states is acquired by at least one of a high-precision map mode, an internal parameter mode, and an external parameter mode.

The high-precision map mode comprises:
the degree of building occlusion in external environment information of different locations is acquired according to the high-precision map and the reliability of the combined navigation and positioning subsystem corresponding to the different locations is set, where the reliability of the combined navigation and positioning subsystem is negatively related to the degree of building occlusion;
the degree of obviousness of features of surrounding objects in the external environment information of the different locations is acquired according to the high-precision map and the reliability of the laser point cloud positioning subsystem corresponding to the different locations is set, where the reliability of the laser point cloud positioning subsystem is positively related to the degree of obviousness of the features of the surrounding objects; and
the degree of light change in the external environment information of the different locations is acquired according to the high-precision map and the reliability of the laser point cloud positioning subsystem corresponding to the different locations is set, where the reliability of the camera visual positioning subsystem is positively related to the degree of light change.

Specifically, the high-precision map may preset the reliability of each positioning subsystem according to different environments and pre-measurement results. For example, between tall buildings, combined navigation is greatly affected by occlusion, and here and now the reliability of the combined navigation and positioning subsystem is lower; in open spaces such as highways and fast roads, surrounding features are not obvious, and the reliability of the laser point cloud positioning subsystem is lower; and in tunnels, boulevards and other darker or alternating light and dark areas, the reliability of the camera visual positioning subsystem is lower.

The internal parameter mode comprises:
the reliability of the combined navigation and positioning subsystem corresponding to the degree of stability of different global navigation satellite system (GNSS) signals and the number of different connected satellites is set according to the degree of stability of the GNSS signals and the number of the connected satellites in the combined navigation and positioning subsystem, where the reliability of the combined navigation and positioning subsystem is positively related to the number of the connected satellites;
the reliability of the laser point cloud positioning subsystem corresponding to the degree of matching of different point clouds is set according to the degree of matching of the point clouds in the laser point cloud positioning subsystem, where the reliability of the laser point cloud positioning subsystem is positively related to the degree of matching of the point clouds; and
the reliability of the camera visual positioning subsystem corresponding to the degree of matching of different features is set according to the degree of matching of the features in the camera visual positioning subsystem, where the reliability of the camera visual positioning subsystem is positively related to the degree of matching of the features.

Specifically, the reliability of each positioning subsystem may be acquired according to the characteristics of the subsystem, the reliability of the combined navigation and positioning subsystem may be acquired according to the connected GNSS signals and the number of connected satellites, and when the signals are stable and there are more connected satellites, the credibility is higher; the credibility of the laser point cloud positioning subsystem may be acquired according to the degree of matching of the point clouds in the laser point cloud positioning subsystem, as a basic parameter, and the higher the degree of matching of the point clouds is, the higher the credibility is; and the credibility of the camera visual positioning subsystem may be acquired according to the degree of matching of the features, as a basic parameter, and the higher the degree of matching of the features is, the higher the credibility is.

The external parameter mode comprises:
the reliability of the laser point cloud positioning subsystem corresponding to values for different particulate matter 2.5 (PM2.5) is set according to the values for the PM2.5 acquired by an external PM2.5 measurement sensor, where the reliability of the laser point cloud positioning subsystem is negatively related to the values for the PM2.5; and
the reliability of the camera visual positioning subsystem corresponding to brightness values of different light is set according to the brightness values of the light acquired by an external light sensor, where the reliability of the camera visual positioning subsystem is positively related to the brightness values of the light.

Specifically, the external sensor is mainly used in the laser point cloud positioning subsystem and the camera visual positioning subsystem. The laser point cloud positioning subsystem may be externally connected with the PM2.5 sensor to detect the impact of fine dust in the air on a laser radar, and the higher the value for the PM2.5 is, the lower the reliability of the laser point cloud positioning subsystem is; and the camera visual positioning subsystem may be externally connected with the light sensor to detect the impact of light on vision of a camera, and the higher the mildness and stability of the light is, the higher the reliability of the camera visual positioning subsystem is.

Figure 3:
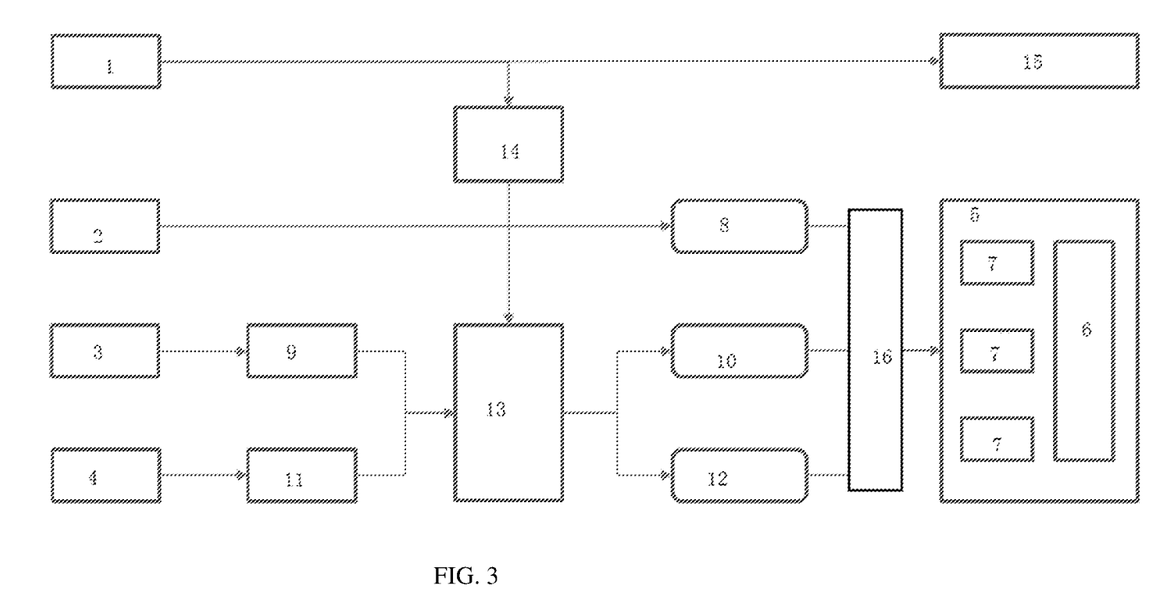
FIG. 3 illustrates a schematic structural diagram of a positioning system according to an embodiment of the present disclosure.

As shown in FIG. 3, the present disclosure further provides a positioning system, including: a plurality of positioning subsystems, a Federated Kalman filter 5, a reliability database (embedded database) and a reliability evaluation module 16, where the Federated Kalman filter 5 includes a main filter 6 and a plurality of sub-filters 7; each sub-filter 7 is configured to filter positioning data of one positioning subsystem;

the reliability database is configured to store a reliability data table for each positioning subsystem, where each reliability data table stores the reliability of each positioning subsystem in different states;

the reliability evaluation module 16 is configured to acquire the real-time credibility from the corresponding credibility data table according to real-time positioning data of each positioning subsystem and calculate a first information distribution weight coefficient of each positioning subsystem involving a fusion operation of the Federated Kalman filter according to the real-time credibility of each positioning subsystem; the main filter 6 is configured to respectively feed back a second information distribution weight coefficient of each positioning subsystem involving the fusion operation to each sub-filter 7;

the reliability evaluation module 16 is configured to determine a final information distribution weight coefficient of each positioning subsystem involving the fusion operation according to the first information distribution weight coefficient and the second information distribution weight coefficient; and the Federated Kalman filter 5 is configured to perform the fusion operation according to the final information distribution weight coefficient of each positioning subsystem and output a final positioning result.

In this embodiment, the reliability evaluation module calculates the percentages of the real-time reliability of each positioning subsystem to a sum of the real-time reliability of the plurality of subsystems, and takes each of the percentages as the first information distribution weight coefficient of each positioning subsystem involving the fusion operation of the Federated Kalman filter 5;

in this embodiment, the reliability evaluation module 16 adds the first and second information distribution weight coefficients of each positioning subsystem and then performs averaging to serve as the final information distribution weight coefficient of each positioning subsystem; and the reliability evaluation module 16 presets a reliability threshold of each positioning subsystem, and when the real-time reliability of the subsystem is higher than or equal to the corresponding reliability threshold, the subsystem performs the fusion operation; and when the real-time reliability of the subsystem is lower than the corresponding reliability threshold, the subsystem does not perform the fusion operation.

In this embodiment, the positioning system further includes a high-precision map 1 and an inertial measurement unit, where the high-precision map 1 and the inertial measurement unit are configured to provide absolute position information; and the plurality of subsystems comprise a combined navigation and positioning subsystem, a laser point cloud positioning subsystem and a camera visual positioning subsystem, and each sub-filter 7 is configured to filter the positioning data output by one positioning subsystem. The combined navigation and positioning subsystem includes a combined navigation device 2 and a combined navigation and positioning attitude fixing unit 8; the laser point cloud positioning subsystem includes at least one laser radar device 3, a point cloud feature recognition unit 9 and a laser point cloud positioning unit 10; and the visual positioning subsystem includes at least one visual sensor device 4 (a variety of cameras), an image feature recognition unit 11 and a camera visual positioning unit 12.

The positioning system in this embodiment further includes a feature matching unit 13, a positioning database 14 and a path planning unit 15. The feature matching unit 13 is configured to perform feature matching on feature values recognized by the point cloud feature recognition unit 9 and a semantic feature recognition unit, and the positioning database 14 and the path planning unit 15 are configured to provide position data information and a planned navigation path of the high-precision map 1.

The present disclosure further provides an automobile, including the above-mentioned positioning system. The automobile using the above positioning system may adapt to various application scenarios in different environments and all-day accurate positioning.

In conclusion, the multi-source fusion operation is performed on the positioning data output by the plurality of different positioning subsystems through the Federated Kalman filter, and the first information distribution weight coefficient is acquired according to the real-time reliability of the different positioning subsystems; the final information distribution weight coefficient of each positioning subsystem involving the fusion operation is adjusted in combination with the first information distribution weight coefficient and the second information distribution weight coefficient fed back by the main filter to effectively optimize the information distribution weight of each positioning subsystem, thereby improving the positioning accuracy and robustness of the positioning system; and meanwhile, the present disclosure can adapt to various application scenarios in different environments and all-day accurate positioning.

Various embodiments of the present disclosure have been described above, and the foregoing description is exemplary, not exhaustive, and not limited to the disclosed embodiments. Numerous modifications and variations are apparent to those of ordinary skill in the art without departing from the scope and spirit of the described embodiments.

What is claimed is:

1. A positioning method, comprising:
    acquiring credibility of each of a plurality of different positioning subsystems in different states and generating a credibility data table for each positioning subsystem;

acquiring real-time credibility from the corresponding credibility data table according to real-time positioning data of each positioning subsystem;

calculating a first information distribution weight coefficient of each positioning subsystem involving a fusion operation of a Federated Kalman filter according to the real-time credibility of each positioning subsystem;

acquiring a second information distribution weight coefficient of each positioning subsystem involving the fusion operation fed back to each sub-filter of the Federated Kalman filter by a main filter of the Federated Kalman filter according to global data; determining a final information distribution weight coefficient of each positioning subsystem involving the fusion operation according to the first information distribution weight coefficient and the second information distribution weight coefficient; and performing, by the Federated Kalman filter, the fusion operation according to the final information distribution weight coefficient of each of the positioning subsystems and outputting a final positioning result.

2. The positioning method according to claim 1, wherein calculating the first information distribution weight coefficient of each positioning subsystem involving the fusion operation of the Federated Kalman filter according to the real-time credibility of each positioning subsystem comprises:

calculating percentages of the real-time reliability of each positioning subsystem to a sum of the real-time reliabilities of the plurality of subsystems, and taking each of the percentages as the first information distribution weight coefficient of each positioning subsystem involving the fusion operation of the Federated Kalman filter.

3. The positioning method according to claim 1, wherein determining the final information distribution weight coefficient of each positioning subsystem involving the fusion operation according to the first information distribution weight coefficient and the second information distribution weight coefficient comprises:

adding the first and second information distribution weight coefficients of each of the positioning subsystems and then performing averaging to serve as the final information distribution weight coefficient of each positioning subsystem.

4. The positioning method according to claim 1, wherein after acquiring the credibility of each of the positioning subsystems in different states, the positioning method further comprises:

respectively setting a reliability threshold for each of the positioning subsystems, and when the real-time reliability of the subsystem is higher than or equal to the corresponding reliability threshold, enabling the subsystem to involve the fusion operation; and when the real-time reliability of the subsystem is lower than the corresponding reliability threshold, enabling the subsystem not to involve the fusion operation.

5. The positioning method according to claim 1, wherein the credibility of each of the positioning subsystems in different states are acquired by calculating the percentages of best states and worst states of operating parameters in historical statistical data of each of the positioning subsystems based on the historical statistical data of states of the operating parameters of each positioning subsystem.

6. The positioning method according to claim 1, wherein acquiring credibility of each of the positioning subsystems in different states comprises:

acquiring, by at least one of a high-precision map mode, an internal parameter mode, and an external parameter mode, the reliabilities of the plurality of positioning subsystems in different states, wherein the plurality of positioning subsystems comprise a combined navigation and positioning subsystem, a laser point cloud positioning subsystem and a camera visual positioning subsystem, and each of the sub-filters is configured to filter the positioning data output by one of the positioning subsystems.

7. The positioning method according to claim 6, wherein the high-precision map mode comprises:

acquiring a degree of building occlusion in external environment information at different locations according to a high-precision map and setting the reliabilities of the combined navigation and positioning subsystem corresponding to the different locations, wherein the reliability of the combined navigation and positioning subsystem is negatively related to the degree of building occlusion;

acquiring a degree of obviousness of features of surrounding objects in the external environment information at the different locations according to the high-precision map and setting the reliabilities of the laser point cloud positioning subsystem corresponding to the different locations, wherein the reliability of the laser point cloud positioning subsystem is positively related to the degree of obviousness of the features of the surrounding objects; and acquiring a degree of light change in the external environment information at different locations according to the high-precision map and setting the reliabilities of the laser point cloud positioning subsystem corresponding to the different locations, wherein the reliability of the camera visual positioning subsystem is positively related to the degree of light change.

8. The positioning method according to claim 6, wherein the internal parameter mode comprises:

setting reliabilities of the combined navigation and positioning subsystem corresponding to different degrees of stability of global navigation satellite system (GNSS) signal and the number of connected satellites according to the degree of stability of the GNSS signal and the number of the connected satellites in the combined navigation and positioning subsystem, wherein the reliability of the combined navigation and positioning subsystem is positively related to the degree of stability of the GNSS signal and the number of the connected satellites;

setting reliabilities of the laser point cloud positioning subsystem corresponding to different degrees of matching of point cloud according to the degree of matching of the point cloud in the laser point cloud positioning subsystem, wherein the reliability of the laser point cloud positioning subsystem is positively related to the degree of matching of the point cloud; and setting reliabilities of the camera visual positioning subsystem corresponding to different degrees of matching of features according to the degree of matching of the features in the camera visual positioning subsystem, wherein the reliability of the camera visual positioning subsystem is positively related to the degree of matching of the features.

9. The positioning method according to claim 6, wherein the external parameter mode comprises:

setting reliabilities of the laser point cloud positioning subsystem corresponding to different values of particulate matter 2.5 (PM2.5) according to the values of the PM2.5 acquired by an external PM2.5 measurement sensor, wherein the reliability of the laser point cloud positioning subsystem is negatively related to the values of PM2.5; and setting reliabilities of the camera visual positioning subsystem corresponding to different brightness values of light according to the brightness values of the light acquired by an external light sensor, wherein the reliability of the camera visual positioning subsystem is positively related to the brightness value of the light.

* * * * *